United States Patent
Riskas et al.

(10) Patent No.: US 10,377,510 B1
(45) Date of Patent: Aug. 13, 2019

(54) ENHANCED FAIRING MECHANISMS FOR LAUNCH SYSTEMS

(71) Applicant: Vector Launch Inc., Tucson, AZ (US)

(72) Inventors: Brian James Riskas, Nipomo, CA (US); Robert Duane Hill, Huntsville, AL (US); Emerald James Adair, Vail, AZ (US); Kerry Michael Kugler, Rigby, ID (US); Richard William Dalgarno, Laramie, WY (US); Mark Edward Bishop, Annapolis, MD (US); Robert Stewart Skillen, Morganton, NC (US)

(73) Assignee: Vector Launch Inc., Tucson, AZ (US)

( * ) Notice: Subject to any disclaimer, the term of this patent is extended or adjusted under 35 U.S.C. 154(b) by 0 days.

(21) Appl. No.: 16/190,808

(22) Filed: Nov. 14, 2018

(51) Int. Cl.
*B64G 1/00* (2006.01)

(52) U.S. Cl.
CPC .......... *B64G 1/002* (2013.01); *B64G 2700/24* (2013.01)

(58) Field of Classification Search
CPC .......... B64G 1/002; B64G 1/64; B64G 1/641; B64G 1/645; B64G 2700/24; B64G 2001/643
See application file for complete search history.

(56) References Cited

U.S. PATENT DOCUMENTS

| | | | |
|---|---|---|---|
| 3,817,011 A | 6/1974 | Weed | |
| 5,372,071 A * | 12/1994 | Richards | B64G 1/641 102/378 |
| 5,411,226 A | 5/1995 | Jones et al. | |
| 5,529,264 A * | 6/1996 | Bedegrew | B64F 1/04 102/274 |
| 5,585,596 A * | 12/1996 | Richards | B64G 1/641 102/378 |
| 5,613,653 A | 3/1997 | Bombled et al. | |
| 5,624,088 A | 4/1997 | Fiore | |
| 5,720,450 A | 2/1998 | Kanne | |
| 5,743,492 A * | 4/1998 | Chan | B64F 1/04 102/274 |
| 5,779,195 A | 7/1998 | Basuthakur et al. | |
| 5,884,866 A | 3/1999 | Steinmeyer et al. | |

(Continued)

OTHER PUBLICATIONS

International Application No. PCT/US2019/023852, International Search Report & Written Opinion, 10 pages, dated Apr. 11, 2019.

*Primary Examiner* — Philip J Bonzell

(57) ABSTRACT

Various enhanced rocket fairings and associated mechanisms are discussed herein for split fairings with two fairing halves. In some implementations, electrically-actuated base clamps are included to deploy the rocket fairing by applying a spring force between a corresponding fairing half and a payload adapter, which directs movement of the fairing halves upwards and away from the payload adapter until release of the fairing halves. In other implementations, electrically-actuated fairing mechanisms are included to hold together a first fairing half and a second fairing half, and separate the first fairing half from the second fairing half using a spring force. In further implementations, one fairing half includes a tab feature configured to overlap a second fairing half. The tab feature can deform inward under a pressure differential between an exterior and a payload envelope to reduce a gap between the two fairing halves.

19 Claims, 9 Drawing Sheets

(56) References Cited

U.S. PATENT DOCUMENTS

| | | |
|---|---|---|
| 6,138,951 A | 10/2000 | Budris et al. |
| 6,206,327 B1 | 3/2001 | Benedetti et al. |
| 6,216,410 B1 | 4/2001 | Haberman |
| 6,276,639 B1 | 8/2001 | Hornung et al. |
| 6,296,206 B1 | 10/2001 | Chamness et al. |
| 6,298,786 B1 * | 10/2001 | Grosskrueger ........ B64G 1/641 102/377 |
| 6,416,018 B2 | 7/2002 | DiVerde et al. |
| 6,494,406 B1 * | 12/2002 | Fukushima ............ B64G 1/002 244/173.3 |
| 6,557,802 B2 | 5/2003 | Kroeker |
| 8,366,053 B2 | 2/2013 | Watts |
| 9,708,080 B2 | 7/2017 | Judd et al. |
| 2006/0185277 A1 | 8/2006 | Quincieu |
| 2017/0021948 A1 | 1/2017 | Yehezkel |
| 2017/0327251 A1 | 11/2017 | Parissenti et al. |

* cited by examiner

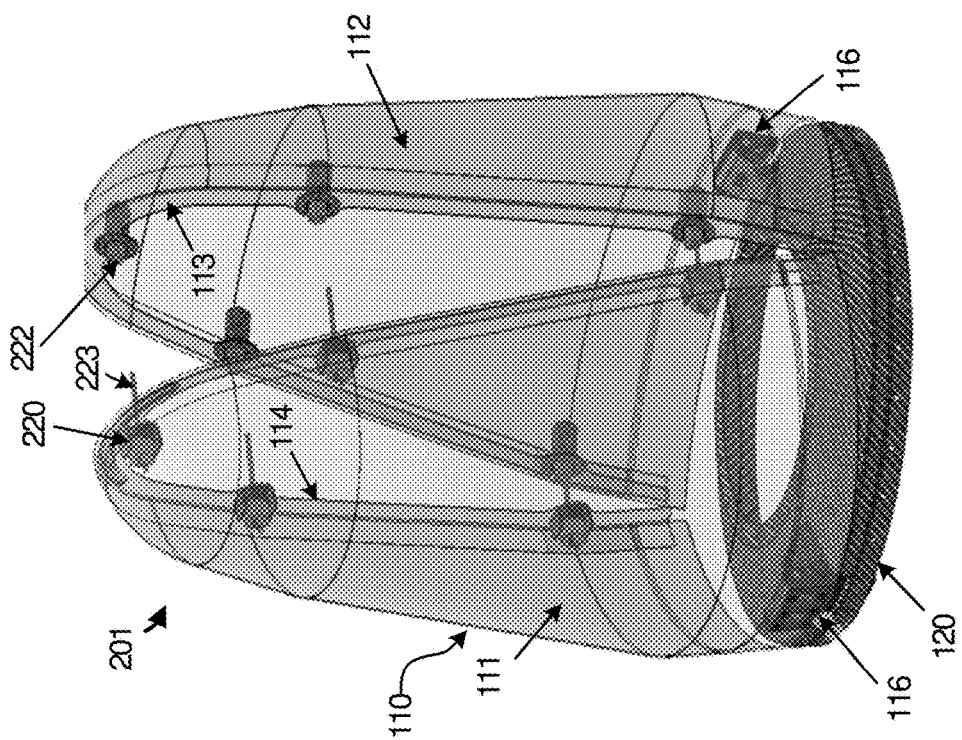
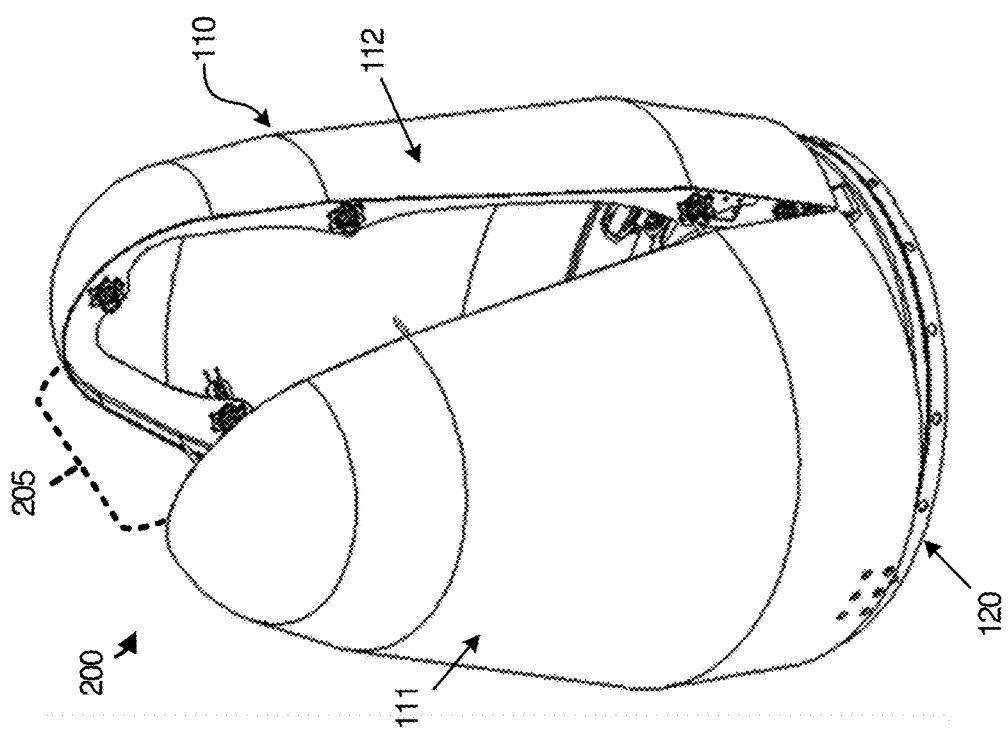

ENHANCED FAIRING MECHANISMS FOR LAUNCH SYSTEMS

BACKGROUND

Satellites and other space-faring payloads can be carried by launch systems, such as launch vehicles, rocket vehicles, rocket stages, or missiles into orbit or other destinations in space. Once the launch system reaches a target destination, target speed or altitude, or desired orbital characteristic, then payload satellites, probes, or other payloads can be deployed for use in various roles. Satellites placed into Earth orbit (or into orbit around other celestial bodies), can perform various tasks, such as sensing, surveillance, communications, or scientific experimentation. Various payload form factors, including modular and custom-built form factors, can be deployed in launch systems. Example satellites include CubeSat-based satellites. CubeSats are a standardized miniaturized satellite architecture for use in inexpensive and rapidly developed space/orbital platforms.

However, when traversing through the atmosphere during launch, a launch system typically includes a nose cone or fairing mounted onto the upper portion of the launch system. This nose cone or fairing protects the payload from thermal heating during ascent, atmospheric debris and moisture, and provides for less aerodynamic drag on the launch system as a whole. Usually, once the launch system reaches a target altitude the fairing is ejected from the launch system prior to payload deployment. However, fairings typically have used pyrotechnic-based or pneumatic-based deployment elements which, although reliable, can be undesirable on smaller launch vehicles.

OVERVIEW

Various enhanced rocket fairings and associated mechanisms are discussed herein for split fairings with two fairing halves. In some implementations, electrically actuated base clamps are included to deploy the rocket fairing by applying a spring force between a corresponding fairing half and a payload adapter, which directs movement of the fairing halves upwards and away from the payload adapter until release of the fairing halves. In other implementations, electrically actuated fairing mechanisms are included to hold together a first fairing half and a second fairing half, and separate the first fairing half from the second fairing half using a spring force. In further implementations, one fairing half includes a tab feature configured to overlap a second fairing half. The tab feature can deform inward under a pressure differential between an exterior and a payload envelope to reduce a gap between the two fairing halves.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIGS. 2A and 2B illustrate a partially open fairing according to an implementation.

DETAILED DESCRIPTION

Payloads can be carried by launch systems from ground-based locations into orbits or trajectories of various configurations, or for delivery to space-based destinations. The payloads, such as satellites, probes, sensors, spacecraft, or other objects, can be deployed and then placed into an operational mode. Typically, an on-board deployment mechanism is used to deploy the payloads away from a corresponding portion of the launch system.

When traveling through an atmosphere during launch, a launch system will typically include a nose cone or payload fairing mounted onto the launch system. This nose cone or payload fairing protects the payload from thermal heating during ascent (from atmospheric compression and drag), atmospheric debris and moisture, as well as providing a more aerodynamic shape on a leading edge of the launch vehicle. Then, when the launch vehicle reaches a target condition, such as a target altitude, target air pressure, or target thermal condition, the fairing is ejected from the launch vehicle to expose the payload to the exterior environment. The fairing can be deployed before reaching a payload deployment destination to reduce overall vehicle weight of the launch vehicle, which can help extend the propulsion capacity of the corresponding vehicle propulsion elements. However, fairings typically have used pyrotechnic-based or pneumatic-based deployment elements that can be undesirable on smaller launch vehicles. Failure of complex deployment systems can lead to failure to deploy a payload or loss of payload. Moreover, many fairing deployment systems may fail to fully prevent the fairing or fairing pieces from contacting the launch vehicle, leading to damage or loss of payload. Provided herein are various improvements to payload fairing mounting and deployment systems, as well as enhanced equipment that can be employed in many types of payload fairing deployment scenarios.

The examples herein include split fairings in a clamshell design. This provides for ease of integration with a payload adapter and base ring onto which the fairing can attach to a launch vehicle. Typical fairing masses in the examples discussed herein are approximately 9 kilograms (kg), while payload adapters are approximately 2 kg. However, the flexible design of the fairing deployment systems and components allows for smaller and larger masses as well as different sizes and configurations of fairings and payloads.

Figure 1B:
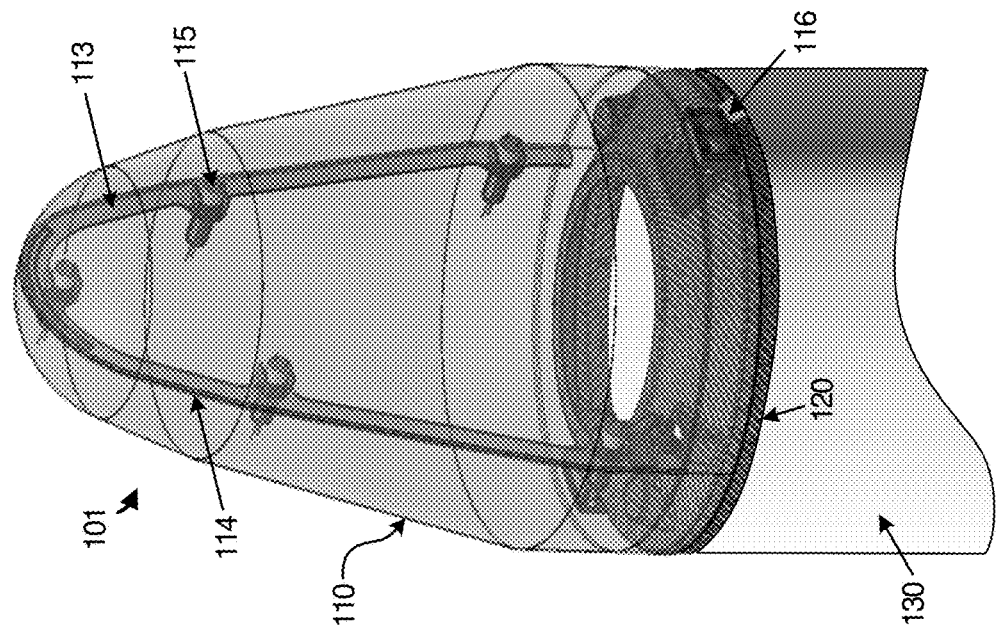
FIGS. 1A and 1B illustrate a closed fairing according to an implementation.
Figure 1A:
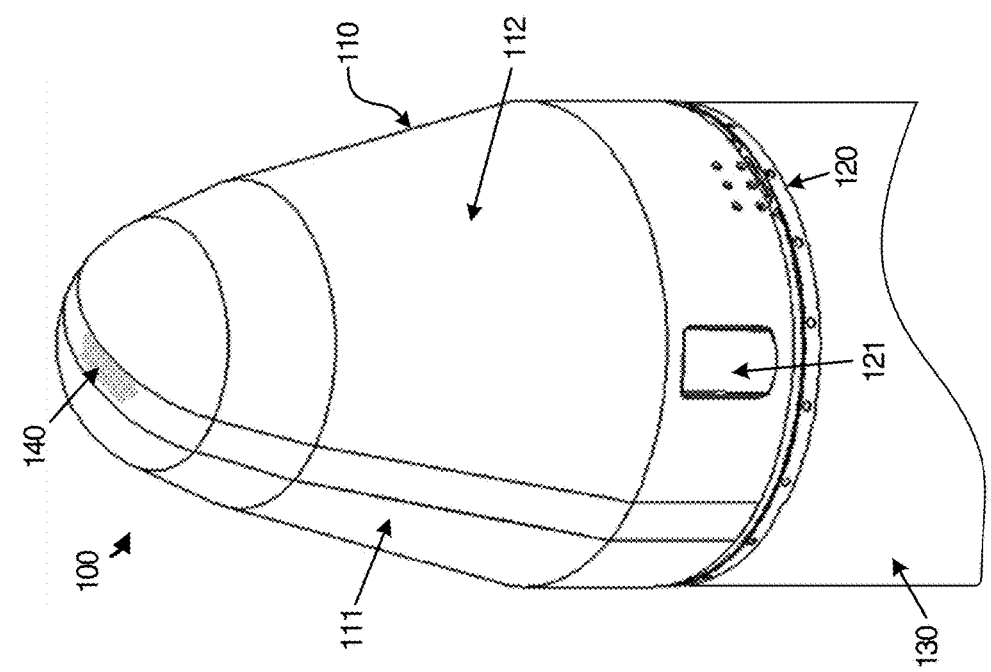

As a first example implementation of an enhanced payload fairing, FIGS. 1A and 1B are presented. FIG. 1A includes view 100 comprising a solid view of an example payload fairing in an undeployed, closed, or "held" configuration. FIG. 1B includes a similar view 101 comprising a semi-transparent view of the example payload fairing in the same undeployed configuration. Fairing 110 includes at least two main fairing portions 111 and 112, referred to herein as fairing halves, which form a split payload fairing. It should be understood that the two fairing portions might not be exactly half of a full fairing, and variations among the structural distribution or fractional coverage of the fairing portions can be employed. Also, more or less than two fairing portions might be included in some implementations.

Fairing 110 can be included on a launch vehicle 130. The portion of launch vehicle 130 pictured in FIG. 1 might comprise a booster, missile, launch vehicle stage (if a multi-stage launch vehicle is used), or to other launch vehicle types. In this example, fairing 110 is coupled to payload adapter 120, and payload adapter 120 is coupled to launch vehicle 130. Other configurations might be employed when a payload adapter is not used, and elements of the fairing used for hold down and deployment can be coupled to launch vehicle 130. Also shown in FIG. 1 is port feature 121. Port feature 121 is optional and can comprise one or more ports for gas or moisture purging, refrigeration/cooling, heating, and electrical/mechanical umbilical connections.

As seen in FIG. 1, a smooth exterior configuration of fairing 110 is provided when assembled and held together. This smooth exterior allows for a more aerodynamic shape with fewer mechanical or structural elements or features exposed to the high pressure, high temperature, and drag of ascent during launch of the associated launch vehicle. One or more coatings can be deposited over the exterior shell of fairing 110. These coatings can comprise cork, polymer resin, paint, power-coated materials, carbon composite materials, or other coatings. When deployed, the fairing halves 111-112 can break through any coating to separate from each other at the corresponding seams.

To couple fairing halves 111-112 together, several deployment mechanisms are employed. A flange is included in each fairing half, into which fairing half deployment mechanisms can be mounted. A portion of the deployment mechanisms are included in each fairing half to provide for holding forces but also release forces among the fairing halves. In FIG. 1, the flanges are indicated as elements 113-114, with deployment mechanisms indicated by elements 115. Furthermore, one or more fairing base deployment mechanisms 116 are provided to hold fairing 110 to payload adapter 120. Deployment mechanisms 115 can comprise hold down and release mechanisms (HDRMs), among other elements, for holding fairing halves 111-112 to each other (and release). Fairing base deployment mechanisms (116) clamp fairing 110 to a base and can comprise HDRMs, among other elements, for holding fairing 110 to payload adapter 120 (and release). Deployment mechanisms 115 and 116 will be discussed in detail in the Figures below.

In operation, a payload or payloads will be mounted or otherwise held by payload adapter 120. The associated launch vehicle 130 ascends through the atmosphere due to propulsion by one or more engines, which may include coasting phases. Fairing 110 is deployed once a deployment target is reached, such as a target altitude, target exterior temperature, target exterior air pressure, target speed, target destination, target orbital configuration, or other deployment target. Deployment of fairing 110 involves releasing fairing halves 111-112 from each other using associated deployment mechanisms 115, and release of fairing halves 111-112 from payload adapter 120 using at least deployment mechanisms 116. Once fairing halves 111-112 have been sufficiently deployed with respect to launch vehicle 130 and payload adapter 120, then the associated payload is exposed to the exterior environment. The associated payload can be deployed away from payload adapter 120 at a designated time or location, depending upon specific launch parameters.

FIGS. 2A and 2B illustrate deployment of fairing halves 111-112 from each other in an example implementation, but before separation from payload adapter 120. In FIG. 2A, a solid rendered view 200 of fairing 110 is shown. In FIG. 2B, a wireframe and semi-transparent rendered view 201 of fairing 110 is shown. Fairing 110 has been opened as shown to a separation distance 205. Separation of fairing halves 111-112 from each other is achieved using separation mechanisms. In this example, the separation mechanisms are included in deployment mechanisms 115. In FIG. 2B, deployment mechanisms 115 are now separated into two portions, namely hold down portion 220 and separation portion 222.

Hold down portion 220 includes bolt or rod 223 which slides into a central space of a spring of separation portion 222. Rod 223 engages with separation portion 222 to keep the spring of separation portion 222 in a compressed state. Once rod 223 is commanded to release from separation portion 222, then the spring of separation portion 222 is allowed to expand and exert a spring force onto fairing half 111 via hold down portion 220. Likewise, a reactionary force is exerted onto fairing half 112 via separation portion 222. Fairing halves 111-112 then separate from each other. All deployment mechanisms 115 are commanded to release in a synchronous fashion to prevent binding and allow for smooth separation of fairing halves 111-112. Before clearance of rods 223 from the associated separation portions 222, rods 223 are configured to gimbal or automatically adjust in the vertical axis to keep the rods parallel with an initial starting position, which is generally parallel to the base of fairing 110 and payload adapter 120.

In addition to fairing perimeter deployment mechanisms 115, further fairing base deployment mechanisms 116 are included. Deployment mechanisms 116 comprise a plurality of fairing clamps internal to fairing 110 that are configured to hold a base of fairing 110 to a payload adapter 120 or another base member. Deployment mechanisms 116 are configured to allow for pivoting of fairing halves 111-112 away from each other during separation, as well as for lifting fairing halves 111-112 up and away from payload adapter 120 and launch vehicle 130. In this manner, fairing halves 111-112 are prevented from contacting launch vehicle 130 inadvertently during separation and deployment. A more detailed discussion of deployment mechanisms 116 is found in FIGS. 5-7.

Figure 3:
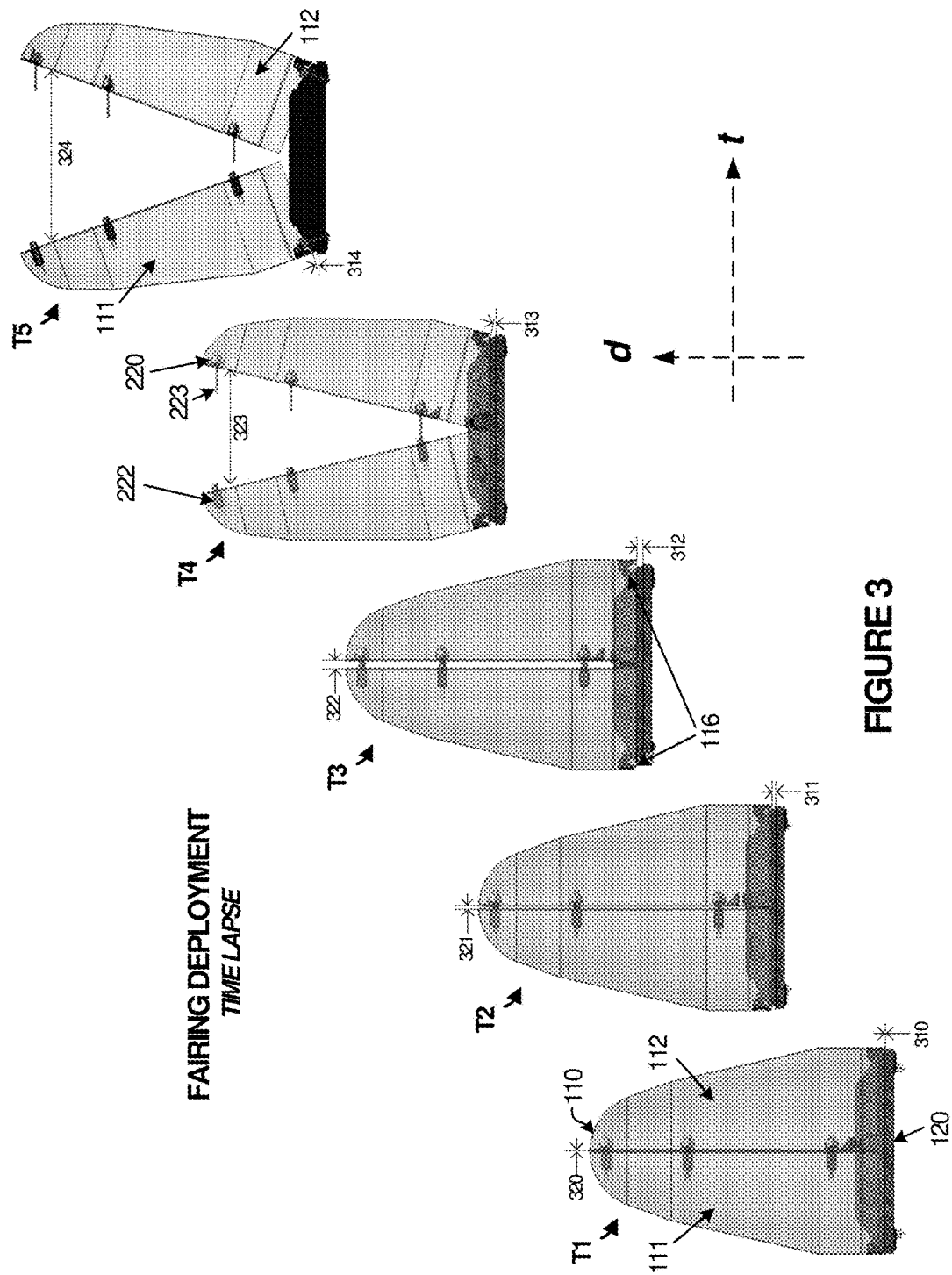
FIG. 3 illustrates a fairing deployment operation according to an implementation.

To further illustrate the separation and deployment of fairing halves 111-112 from launch vehicle 130 and payload adapter 120, FIG. 3 is presented. FIG. 3 illustrates a time-lapse view of separation and deployment of fairing halves 111-112. A horizontal time (t) axis in FIG. 3 is shown as well as a vertical distance (d) axis. The vertical distance axis corresponds to movement of launch vehicle 130 forward/upwards, depending upon a current orientation of launch vehicle 130 with respect to a launch origin. The time lapse of FIG. 3 illustrates an initial parallel separation of the fairing halves, with at least a partially concurrent rise in the fairing up from a base ring or payload adapter. Once a predetermined separation and lift limit is reached, then a pivot or gimbal of the fairing halves occurs before separation from the launch vehicle.

Specifically, at time T1, fairing halves 111-112 are still held down and coupled to each other before separation begins. Once commanded by associated control systems, deployment mechanisms 115 and 116 can initiate separation of fairing halves 111-112. Separation distance 320 is shown as essentially a zero distance in this example due to fairing halves 111-112 still being undeployed. Moreover, fairing rise 310 is also essentially a zero height in this example. At time T2, deployment has been initiated. Fairing halves 111-112 begin to separate via deployment mechanisms 115 and 116. Separation distance 321 is shown as a first separation distance between fairing halves 111-112, and fairing rise 311 has begun to increase. This increase in fairing rise 311 is attributed to the mechanical elements of deployment mechanisms 116, which allow for concurrent pivot and lift of fairing halves 111-112 with respect to payload adapter 120. However, at time T2, this fairing pivot has not yet been initiated. At time T3, deployment continues with further separation of fairing halves 111-112 to separation distance 322, and further fairing rise 312. At time T3, the fairing pivot has also not yet been initiated.

Now, turning to time T4, not only has separation distance 323 increased from that of separation distance 322, but also a pivot has initiated due to the mechanical operation of deployment mechanisms 116. Rise 313 thus includes an angular portion corresponding to the pivot amount. At time T5, further separation distance 324 is achieved, along with further pivot by deployment mechanisms 116. Rise 314 also includes an angular portion corresponding to the increased pivot amount.

As can be seen in FIG. 3, deployment mechanisms 115 have rod portions 332 which remain generally parallel to payload adapter 120. This orientation is typically aligned with an initial orientation before deployment, and allows for smooth separation of fairing halves 111-112 from each other without binding in the mating mechanisms of separation mechanisms 222. A gimbal or pivot can be included in each hold down portion 220 to provide for this orientation. Moreover, portions of separation mechanisms 222 might also pivot or gimbal to provide for a similar orientation.

Figure 4:
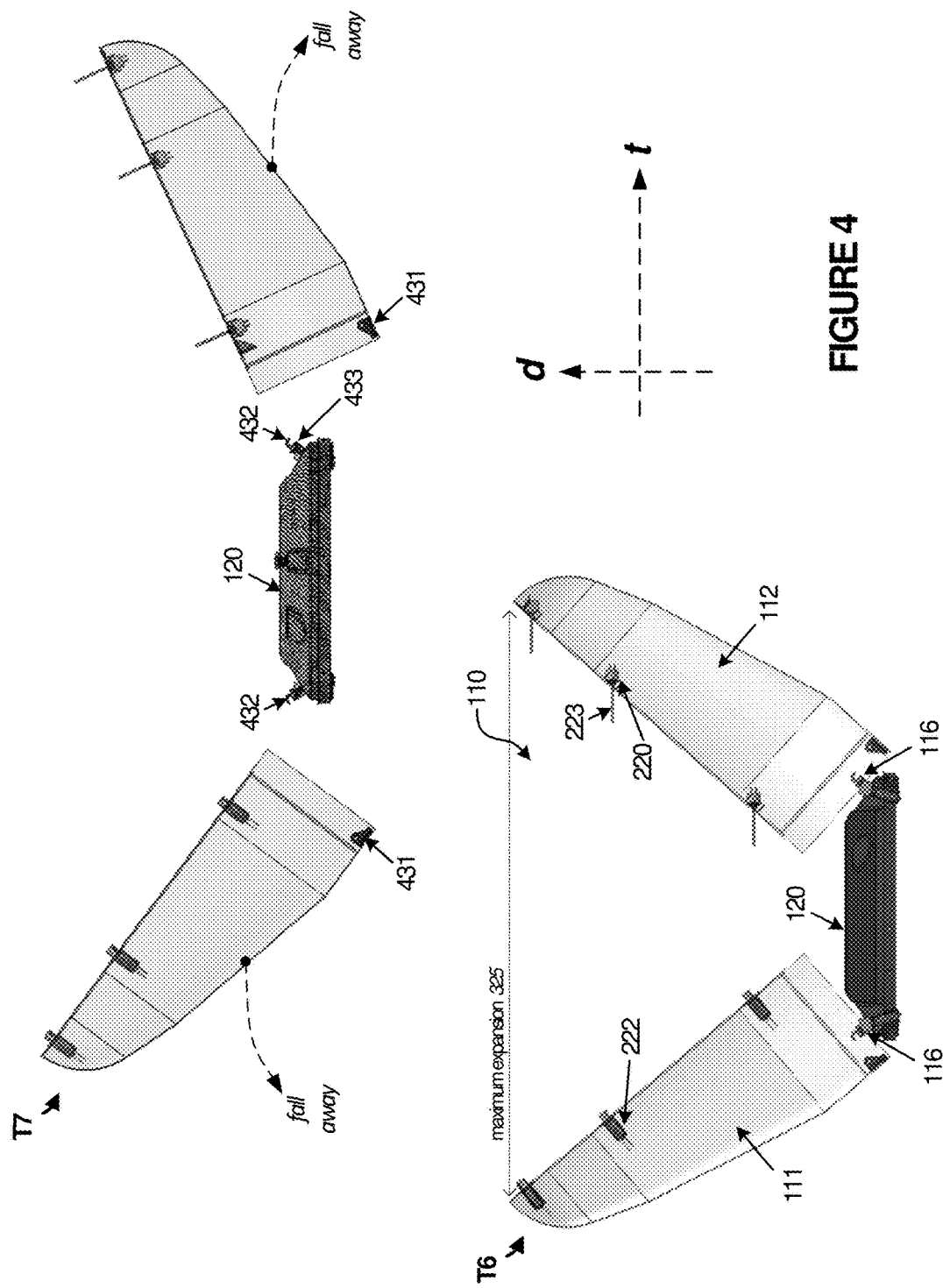
FIG. 4 illustrates a fairing deployment operation according to an implementation.

FIG. 4 continues the deployment and separation of fairing halves 111-112 from each other, as well as separation of faring 110 from payload adapter 120 and launch vehicle 130. Once a maximum expansion of fairing halves 111-112 from each other has occurred at time T6, namely separation distance 325, then fairing halves 111-112 can be released from deployment mechanisms 116. At time T7, fairing halves 111-112 have just been released from deployment mechanisms 116 and have no contact with payload adapter 120 and launch vehicle 130. Once released, fairing halves 111-112 can fall away from launch vehicle 130. Advantageously, release of fairing halves 111-112 in this manner can prevent collision or contact with payload adapter 120 and launch vehicle 130. This prevention of contact will reduce instances of damage to payload adapter 120 and launch vehicle 130, as well as to the payload itself.

Figure 5:
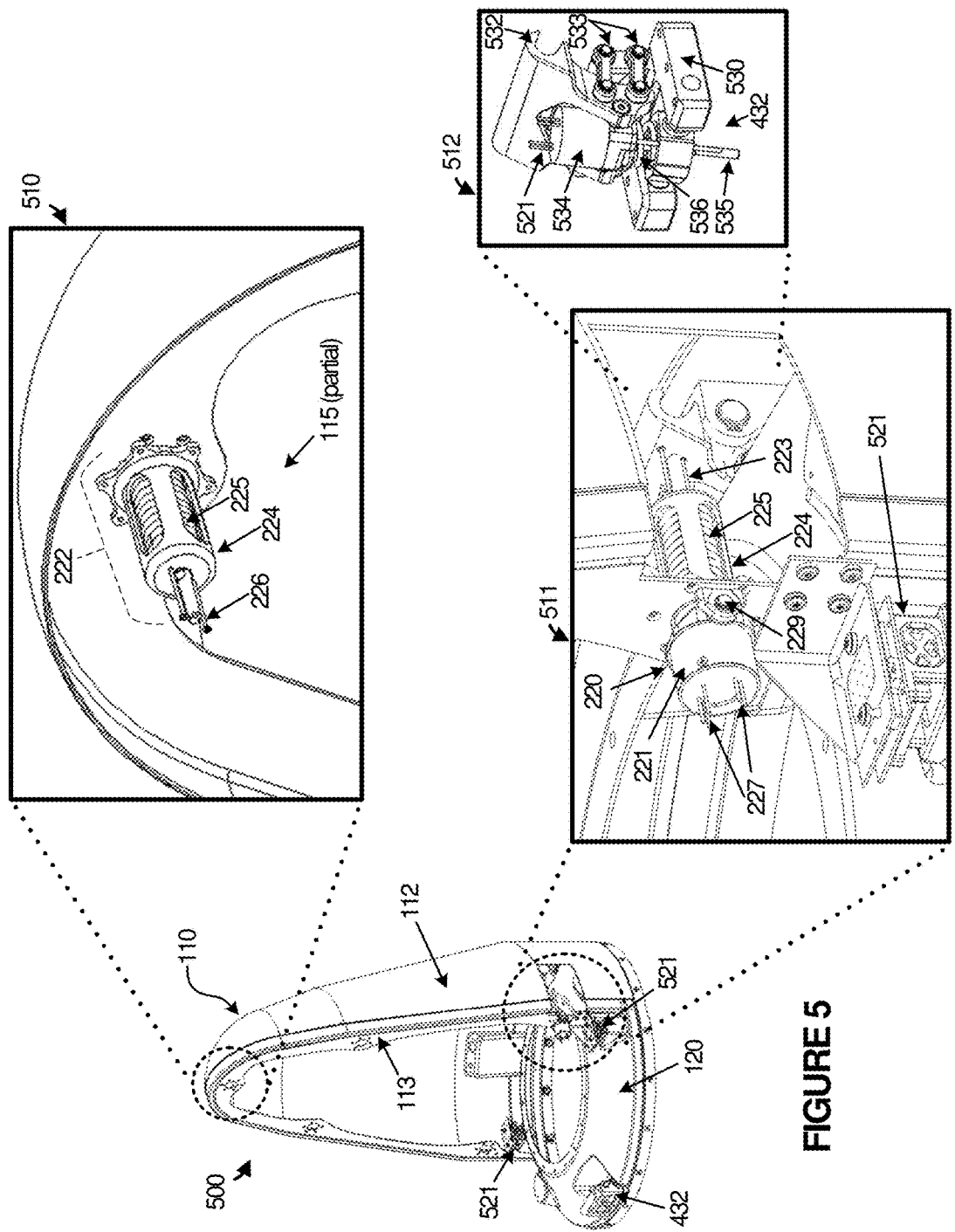
FIG. 5 illustrates fairing hold down and release mechanisms according to an implementation.

FIG. 5 illustrates a detailed view of fairing perimeter deployment mechanisms 115 and fairing base deployment mechanisms 116 in an implementation. An example overview 500 is shown to give context to relative positioning of the deployment mechanisms within fairing 110. Only fairing half 112 is shown for clarity, and individual deployment mechanisms 115 are also omitted from view 500 to illustrate the mounting features of flange 113 of fairing 112. Fairing 111 will have similar mounting features in flange 114.

Turning now to detailed view 510, a close-up view of a portion of deployment mechanism 115 is shown, namely separation portion 222 mounted into a top mounting feature of fairing half 112. Similar separation mechanisms can be included into other mounting features of fairing half 112, such as shown in view 511. A total of five (5) deployment mechanisms 115 are included in fairing 110, with five individual separation portions 222 included in fairing half 112. A corresponding quantity of hold down portions 220 are included in fairing half 111. It should be understood that the particular fairing half that includes hold down portions 220 or separation portions 222 might be different in other implementations. Also, the quantity of deployment mechanisms can vary in other implementations.

Separation portion 222 in view 510 also includes pusher elements 226, body 224, and coil spring 225, as well as various chassis, body, and fastening elements. When spring 225 is compressed, a spring force is kept within separation portion 222 for future separation of fairing half 112 from fairing half 111. A rod 223 of hold down portion 220 is inserted into a central shaft cavity of separation portion 222, and rod 223 can lock into separation portion 222 to maintain a compressive force on spring 225. When rod 223 is released into an unlocked position, then spring 225 can exert a spring force onto pusher elements 226 which exert a corresponding force onto the other fairing half for separation. Spring 225 comprises a captured coil that is held captive in body 224 to prevent spring 225 from leaving separation portion 222.

View 511 shows another example deployment mechanism 115 in an undeployed configuration, with spring 225 compressed and held by rod 223. Portions of fairing 112 have been excluded from view 511 for clarity. Also, hold down portion 220 is shown in view 511. Several control lines 227 are seen for actuator 221 of hold down portion 220. These control lines might comprise one or more power inputs, reference potentials, control signals, and sensing signals, and may also comprise redundant versions. Analog or digital interfaces and signaling might be carried over one or more of control lines 227. Responsive to at least a command received over control lines 227, actuator 221 releases rod 223 to allow spring 225 to exert a spring force onto an opposing fairing half for fairing separation. The command provided over control lines 227 might be one or more logical instructions, signaling commands, or digital commands. However, in some examples, the command might instead comprise the act of application or removal of power to one or more signaling/power lines among control lines 227. Pivot or gimbal 229 is also shown in view 511 which allows hold down portion 220 to rotate about at least one axis during separation and allow rod 223 to release smoothly and without binding from body 224 of separation portion 222.

Also shown in view 511 is power coupling 521. A top connector or connectors of power coupling 521 will couple to associated ones of the various deployment mechanisms, such as to control lines 227 and other control lines of base deployment mechanisms. One or more power couplings might be included, such as two shown in FIG. 5. Power coupling 521 provides electrical power and signaling/command control for the deployment mechanisms and associated actuators. In FIG. 5, a first power coupling 521 can carry power or signaling for the fairing deployment mechanisms and actuators, while a second power coupling 521 can carry power or signaling for the payload. Other configurations of signaling and power allocations among power couplings 521 can be implemented. Typically, power couplings 521 each comprise a first portion which remains captive to the payload adapter or launch vehicle, and a second portion which separates with the fairing or payload. Spring-loaded pogo pins can be included on one or more of the portions to ensure constant electrical contact is maintained between the portions during transport, launch, and deployment initiation.

Power coupling 521 is separated during or concurrent with release of fairing halves 111-112. In some examples, power coupling 521 comprises magnetic couplers to ensure electrical connection until release of the associated fairing halves. In other examples, other types of coupling mechanisms might be employed, and these mechanisms provide for low-torque, low-force separation of power/signaling lines from payload adapter 120 or launch vehicle 130 and fairing 110.

Detailed view 512 shows components of base deployment mechanism 116, specifically, portion 432. Portion 432 comprises a hold down and release mechanism which is coupled via base attachment member 530 to either payload adapter 120 or the structure of launch vehicle 130. Portion 432 includes various elements which are shown in better detail in FIGS. 6A and 6B.

Figure 6B:
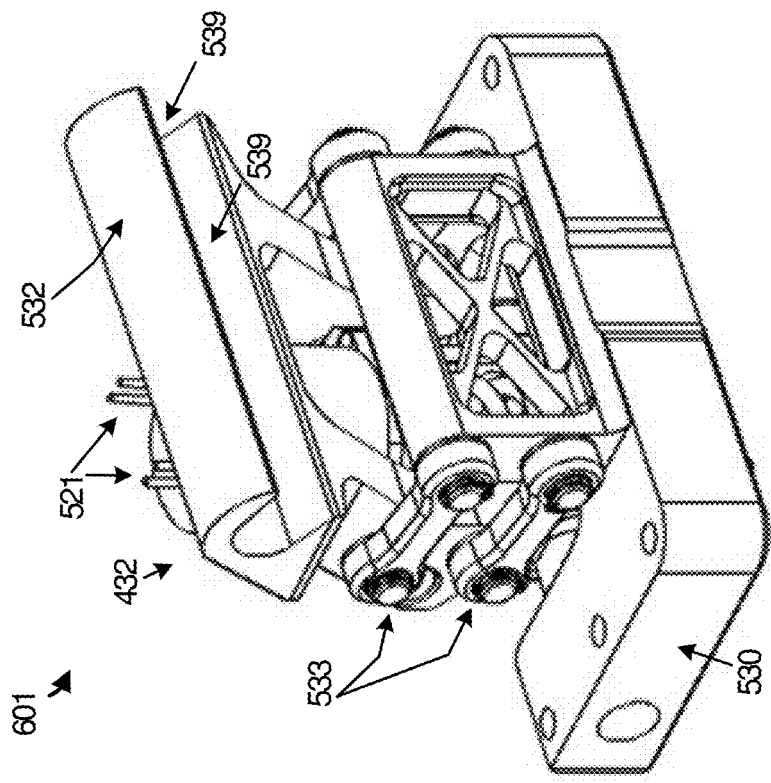
FIGS. 6A and 6B illustrate fairing hold down and release mechanisms according to an implementation.
Figure 6A:
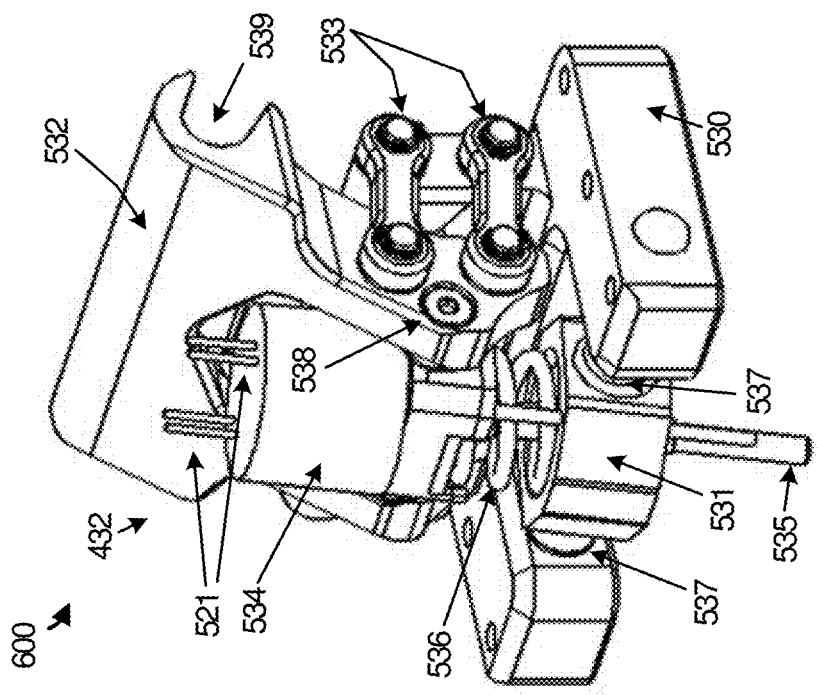

FIG. 6A includes a first view 600 a portion of base deployment mechanism 116. FIG. 6B includes a second view 601 the same portion of base deployment mechanism 116. View 601 is rotated approximately 90 degrees from first view 600. Deployment mechanism 116 comprises base attachment member 530 to which other components of deployment mechanism 116 are coupled. Hook member 532 pivotally couples to pin member 733 (shown in FIG. 7) that fits into channel 539 and is fixed to a corresponding fairing half to provide deployment of the corresponding fairing half.

Hook member 532 is also coupled to an eccentric hinge mechanism formed by four sets of linkage members 533 (two per side) which allow initial movement of hook member 523 generally upward with respect to base attachment member 530, followed by rotation in a direction outward for separation of an attached fairing. The initial upward movement is generated by the geometric properties of linkage members 533 comprising the 4 'bars' pictured in views 600 and 601. During deployment and release, linkage members 533 start with the 4 bars horizontal with respect to base attachment member 530. The initial velocity vector of linkage members 533 will be tangent to the arc of linkage members 533. In this case, by putting linkage members 533 horizontal, deployment mechanism 116 assures that the initial velocity is purely vertical (or nearly so). As linkage members 533 rotate through a range of motion, a horizontal motion is also imparted onto the corresponding fairing halves to help clear the payload accommodation. Advantageously, deployment mechanism 116 is designed so that there is no timing circuit needed to ensure proper deployment of a fairing. Elements of deployment mechanism 116 are kinematically coupled, such that only a single trigger signal to actuator 534 is needed to initiate the deployment. This leads to advantageous savings in weight and cost, as well as a reduced complexity of the deployment system.

Views 600 and 601 show deployment mechanism 116 in an undeployed configuration, with coil spring 536 compressed and held by rod 535. A hold down and release mechanism is shown comprising actuator 534, spring 536, spring housing 531, and bolt or rod 535. When actuated using power or signaling transferred over control lines 521, actuator 534 will allow spring 536 to exert a spring force onto hook member 532 for movement of hook member 532. Spring housing 531 can gimbal or pivot with respect to base attachment member 530 via pivots 537. Actuator 534 can gimbal or pivot with respect to hook member 532 via pivots 538. Pivots 537 and 538 allow for the spring force of spring 536 to be exerted in a generally linear and smooth fashion while hook member 532 moves in an eccentric manner with respect to base attachment member 530.

Several control lines 521 are seen for electrical actuator 534. These control lines might comprise one or more power inputs, reference potentials, control signals, and sensing signals, and may also comprise redundant versions. Analog or digital interfaces and signaling might be carried over one or more of control lines 521. Responsive to at least a command received over control lines 521, actuator 534 releases rod 535 to allow spring 536 to exert a spring force onto hook member 532. The command provided over control lines 521 might be one or more logical instructions, signaling commands, or digital commands. However, in some examples, the command might instead comprise the act of application or removal of power to one or more signaling/power lines among control lines 521.

Various actuators are discussed herein, such as actuators 221 in perimeter deployment mechanisms 115 and actuators 534 in base deployment mechanisms 116. These actuators can comprise electrically actuated mechanisms which release a rod or bolt responsive to a command or application of power/signaling. Before release of the associated rod, an actuator keeps a captive spring under compression, where the spring has been pre-loaded during assembly and attachment of the corresponding fairing. This assembly and attachment can be for attaching the fairing halves to each other or the assembled fairing to a base, payload adapter, or launch vehicle. Typically, the actuators resist tension force only, and a pre-loaded spring under compression provides this tension force in the mechanisms discussed herein. When commanded to release, the actuators release a bolt or rod which allows the captive and compressed spring to exert a spring force onto corresponding members.

In some examples, the actuators each comprise a hold down release mechanism (HDRM) which provides a non-pyrotechnic electrically actuated fuse element. These electrically actuated HDRMs use no pyrotechnical elements, nor pneumatic/hydraulic elements. When actuated, an HDRM releases a rod or bolt coupled to the fuse element. Advantageously, HDRMs provide reliable and fast release upon actuation. Moreover, HDRMs are less susceptible to transients, noise, and interference, such as electromagnetic interference, electrostatic discharge, or radio frequency interference, among other interference resistance. In comparison to pyrotechnic or pneumatic/hydraulic release mechanisms, electrically actuated HDRMs can provide for more reliable and less susceptible mechanisms. HDRMs are also user-serviceable without pyrotechnic training, able to have possible failures detected before actuation, and can be replaced easily in situ. However, despite the advantages of HDRMs, one or more of the actuators might instead be pyrotechnic in nature.

In a particular implementation, and HDRM might comprise a size '2' low-lading type of HDRM. However, HDRMs also scale well to smaller or larger sizes to fit the application and particular fairing size. An HDRM can consume varying amounts of electrical power, depending upon the sizing. For example, an HDRM might consume 30 amperes for several milliseconds, although variations are possible.

Figure 7:
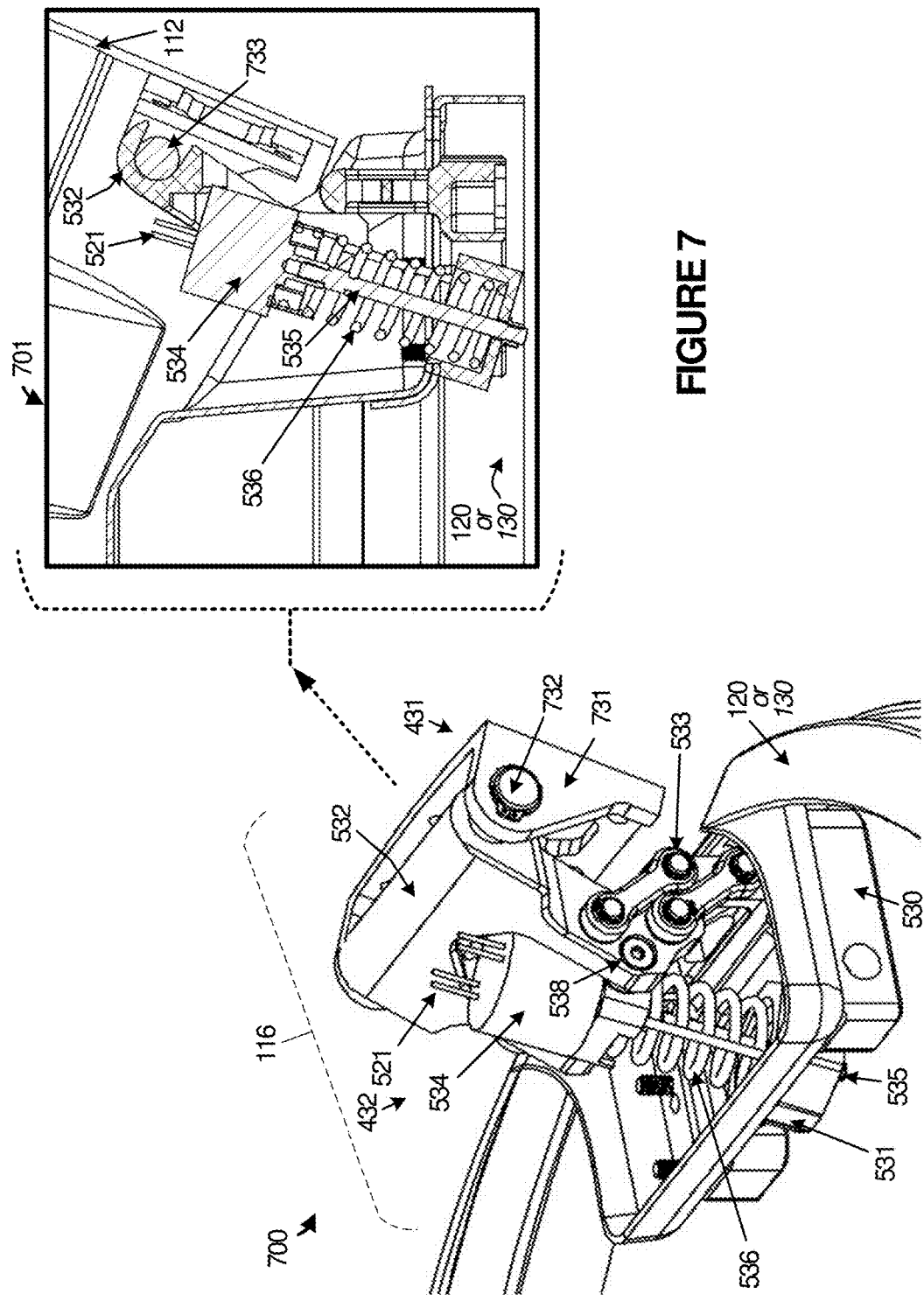
FIG. 7 illustrates fairing hold down and release mechanisms according to an implementation.

FIG. 7 is now presented to show further details and context for an example base deployment mechanism 116. Both view 700 and view 701 illustrate a partially deployed configuration of base deployment mechanism 116. View 700 shows the two main portions of base deployment mechanisms 116, namely portion 431 and portion 432. Detailed view 701 shows a side cross-section of base deployment mechanism 116.

Portion 432 of base deployment mechanism 116 includes elements as previously discussed in FIG. 5, as well as further contextual elements such as payload adapter 120 (or alternatively a portion of launch vehicle 130). Base attachment member 530 is coupled via fasteners, welds, or adhesives to a base ring or plate which is part of payload adapter 120 or launch vehicle 130. From base attachment member 530, spring 536 can exert a spring force, when released by actuator 534 and rod 535, and deploy an attached fairing half. This fairing half, such as fairing half 112, is coupled to portion 431 of base deployment mechanism 116. Fairing bracket 731 is coupled via fasteners, welds, or adhesives to fairing half 112 in this example. Fairing bracket 731 is also coupled to pin member 733. Pin member 733 is captive in fairing bracket and can preferably rotate or pivot via pivoting joint 732. Hook member 532 couples to pin member 733 during assembly of the fairing halves to payload adapter 120 or launch vehicle 130. Hook member 532 separates from pin member 733 during deployment of the associated fairing half via an opening in channel 539. The angle and configuration of channel 539 can determine how the associated fairing half falls away.

As can be seen in views 700 and 701, the four sets of linkage members 533 have been moved upward and outward with regard to base attachment member 530. Also, pivots 537 and 538 allow for spring housing 531, actuator 534, rod 535, and spring 536 to maintain a generally linear actuation motion resultant from the spring force exerted by spring 536. Linkage members 533 guide hook member 532 upward and away from base attachment member 530, which consequently also moves the attached fairing half upward and away from payload adapter 120 or launch vehicle 130. Advantageously, this upward and away movement reduces probability of inadvertent contact of the fairing halves with the payload, payload adapter, or launch vehicle during deployment and after separation of the fairing halves.

During assembly of the fairing, hook member 532 preloads a spring force into spring 536. This spring force can be adjustable using different spring stiffness rate spring selections. Similarly, springs included in perimeter deployment mechanisms 115 can also be selected among different spring stiffness rates for a desired fairing half separation speed and force. Variations in mechanical stackup of deployment mechanisms can be compensated for using or adjustment features, adjustment nuts along actuator rods, or lengths of actuator rods. Advantageously, the inclusion of hook member 532 along with the adjustable actuator rods provides for more effective integration into varying mechanical stackups, less sensitivity to tolerances of stackups, and ease in manufacturing and assembly.

Moreover, the deployment mechanisms discussed herein fit entirely within an internal envelope of a fairing, leaving no exposed or external elements. This configuration provides for a smooth fairing exterior when the fairing halves are mated together. The smooth fairing exterior advantageously allows for better aerodynamic performance and reduces possibility of snags from ground system equipment, cables, and propellant tubing. As will be seen in FIG. 8, this smooth fairing exterior also provides for better adhesion of exterior coatings.

We turn now to a brief discussion on the materials for elements of the deployment mechanisms discussed herein. The fairing halves and associated flanges and tabs can be formed from various materials. In one example, composite material or carbon fiber composite material formed by carbon fibers (or other fiber materials) and resin can be employed. Various polymer or metallic materials can instead be employed. Combinations of these materials can also be employed. In some examples, the fairing halves are formed using additive manufacturing techniques, such as 3-D printing and the like. Various components of the deployment mechanisms, such as linkages, pivots, gimbals, rods, pins, hooks, and bodies can be formed from metallic materials, composite materials, polymers, or other materials, including combinations thereof. These various components of the deployment mechanisms can be formed using machining techniques, casting techniques, or additive manufacturing techniques. Spring components typically comprise coil springs herein, but might instead comprise other types of spring members. Spring components are generally metallic in composition, but other spring-compatible materials might instead be employed. Instead of springs, other elements or devices which provide a spring-like separation force can be employed, such as solenoids, motors, servos, rapidly expanding materials, gas or liquid pistons, and pneumatic or hydraulic actuators, among other elements.

Figure 8:
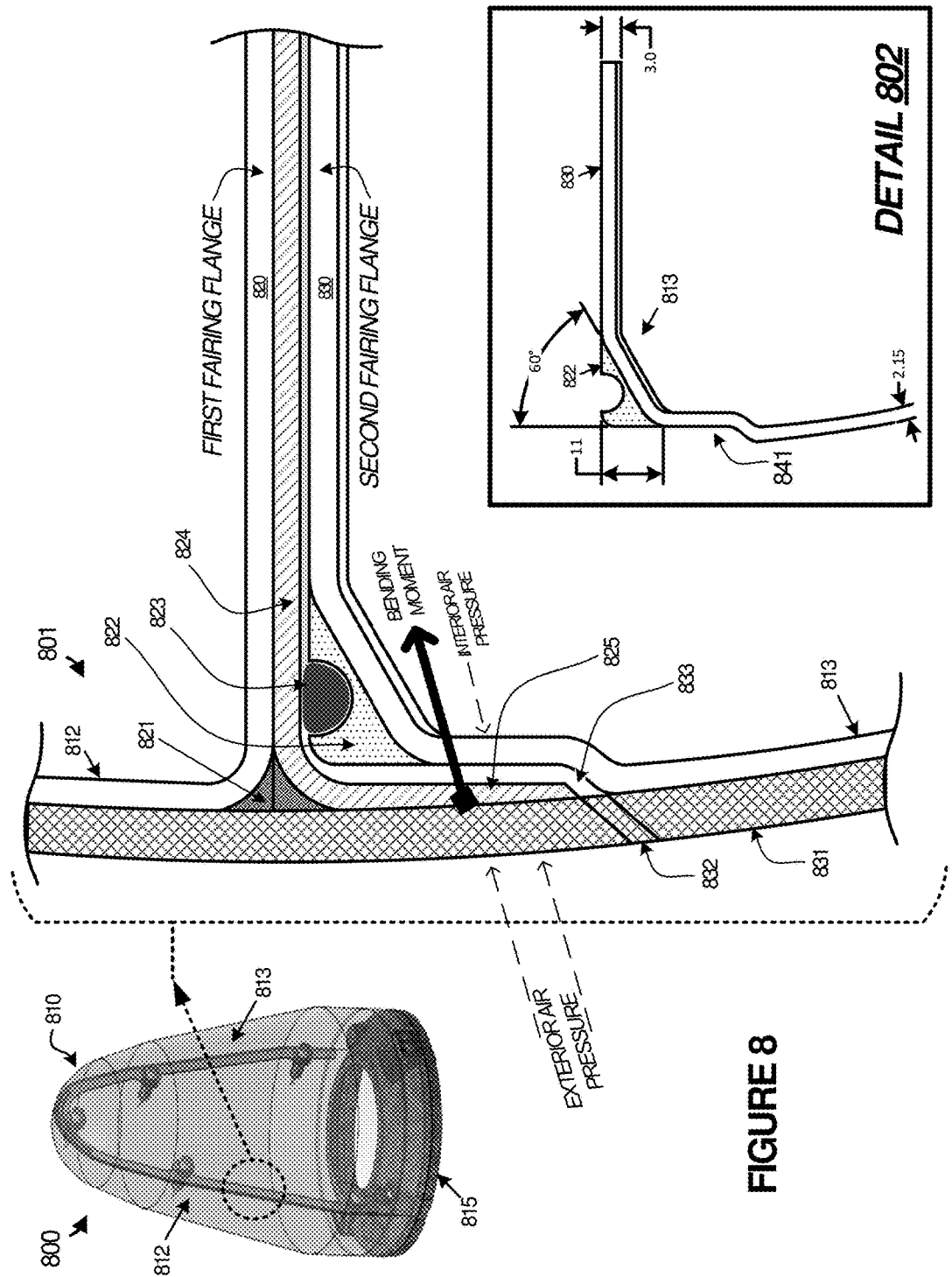
FIG. 8 illustrates fairing sealing features according to an implementation.

FIG. 8 illustrates fairing sealing features according to an implementation. In view 800, example fairing 810 is shown in a closed or undeployed configuration. A first fairing half 812 and second fairing half 813 are joined together and mounted to payload adapter 815. View 801 illustrates a detailed cross-sectional view of the joint formed between first fairing half 812 and second fairing half 813. View 802 illustrates a further detailed view of first fairing half 812 to show example dimensions and angles.

Fairing halves 812 and 813 are held together using one or more hold down mechanisms, such as discussed herein for the various perimeter deployment mechanisms. Fairing halves 812 and 813 are positioned together during assembly and associated deployment mechanisms can be pre-loaded for later actuated deployment using various spring elements.

In view 801, fairing halves 812 and 813 are shown held together and with associated internal flanges. Fairing half 812 includes first fairing flange 820, and fairing half 813 includes second fairing flange 830. Furthermore, first fairing 812 includes tab member 824 with tab 825. Tab member 824 is coupled to fairing flange 820. Tab member 824 can be coupled to fairing flange 820 using various techniques, such as adhesives, fasteners, welds, or formed from a single piece of machined material or composite material—depending upon the material selected for each.

Tab 825 is positioned to form a mating joint with fairing half 813 and fairing flange 830. Tab 825 thus overlaps a portion of fairing 813. The amount of overlap can be selected based on implementation, such as according to tab flexibility targets or proportional to fairing size. The overlap initially can form a small gap 833 between tab 825 and fairing half 813. This gap might be minimal in some examples, and tab 825 may or may not initially make contact with fairing half 813. Tab 825 is configured to be flexible to flex inward with respect to fairing 810. As will be discussed below, this flex can occur responsive to differences in air pressure between an exterior environment and interior of fairing 810.

Tab 825 provides for a self-sealing overlap joint between fairing halves to prevent air penetration and thermal penetration to an interior volume or internal envelope of fairing 810. In FIG. 8, a fairing seal system is presented comprising an exterior sealing lip formed by tab 825 disposed along a corresponding perimeter of fairing half 812 and proximate to a corresponding internal flange 820 of fairing 812. Tab 825 is configured to overlap fairing half 813 when the fairing halves are mated together to form the rocket fairing. Fairing half 812 includes this tab feature disposed along a fairing mating edge, and tab 825 is configured to overlap external to the rocket fairing at least a portion of a mating edge of a second of the fairing halves (813).

Tab 825 is configured to deform inward under a pressure differential between an exterior of the rocket fairing and an interior of the rocket fairing to at least reduce gap 833 between fairing half 812 and fairing half 813. Impingement of airflow during launch creates a pressure differential that establishes a bending moment in tab 825. Tab 825 also forms a thermal seal between fairing halves, provides protection of the internal envelope and payload from the external environment, and prevents supersonic airflow penetration into the interior of fairing 810 without compromising a thermal barrier at the fairing split line or interface. Moreover, gap 833 between tab 825 and opposite fairing 813 has a shape formed by tab 825 and tab overlap feature 841 to reduce material stiction while providing a preliminary seal prior to deformation of tab 825.

Conformal barrier 831 is provided on an external surface of fairing 810. As discussed herein for the various deployment mechanisms, a smooth exterior surface is provided by fairing 810. This smooth exterior allows for enhanced application and adhesion of conformal barrier 831. Conformal barrier 831 can be applied after assembly of the two fairing halves together into fairing 810. Conformal barrier 831 can comprise a thermal protection coating deposited over the exterior of fairing 810 and configured to deform with the flexing of tab 825. When applied after joining of the fairing halves to each other, conformal barrier 831 can extend over the joint or split between the fairing halves. When fairing halves are then separated, conformal barrier 831 can break apart at separation point 832. Conformal barrier 831 can comprise cork material bonded to fairing 810, or might instead polyurethane, polymer resin, paint, power-coated materials, carbon composite materials, or other coatings. In some examples, a top portion of fairing 810, referred to as a nose, might also have a coating of a high temperature polyurethane.

A thermal ingress protection material is deposited in at least a portion of gap 833 between the first internal flange 820 and the second internal flange 830. In FIG. 8, this thermal ingress protection material comprises thermal protection material 822. Thermal protection material 822 might comprise ceramic material, polymer, or other thermally insulating material. Thermal protection material 822 is configured to reduce thermal ingress into the internal payload envelope from at least airflow external to fairing 810. Gasket 823 can be disposed within a channel in the thermal protection material which follows the entire internal perimeter of flange 830. This gasket can comprise an O-ring comprised of rubber, silicone, deformable metal, or polymer. Furthermore, optional inert fill material 821 can be included to fill any gaps between fairing 812, fairing flange 820, and associated tab features. Fill material 821 is provided to establish a smooth exterior surface of fairing 810. When a curved gap is not included in fairing 812, fairing flange 820, and associated tab features, such as when those components are formed by additive or 3-D printing, then fill material 821 can be omitted.

Figure 9:
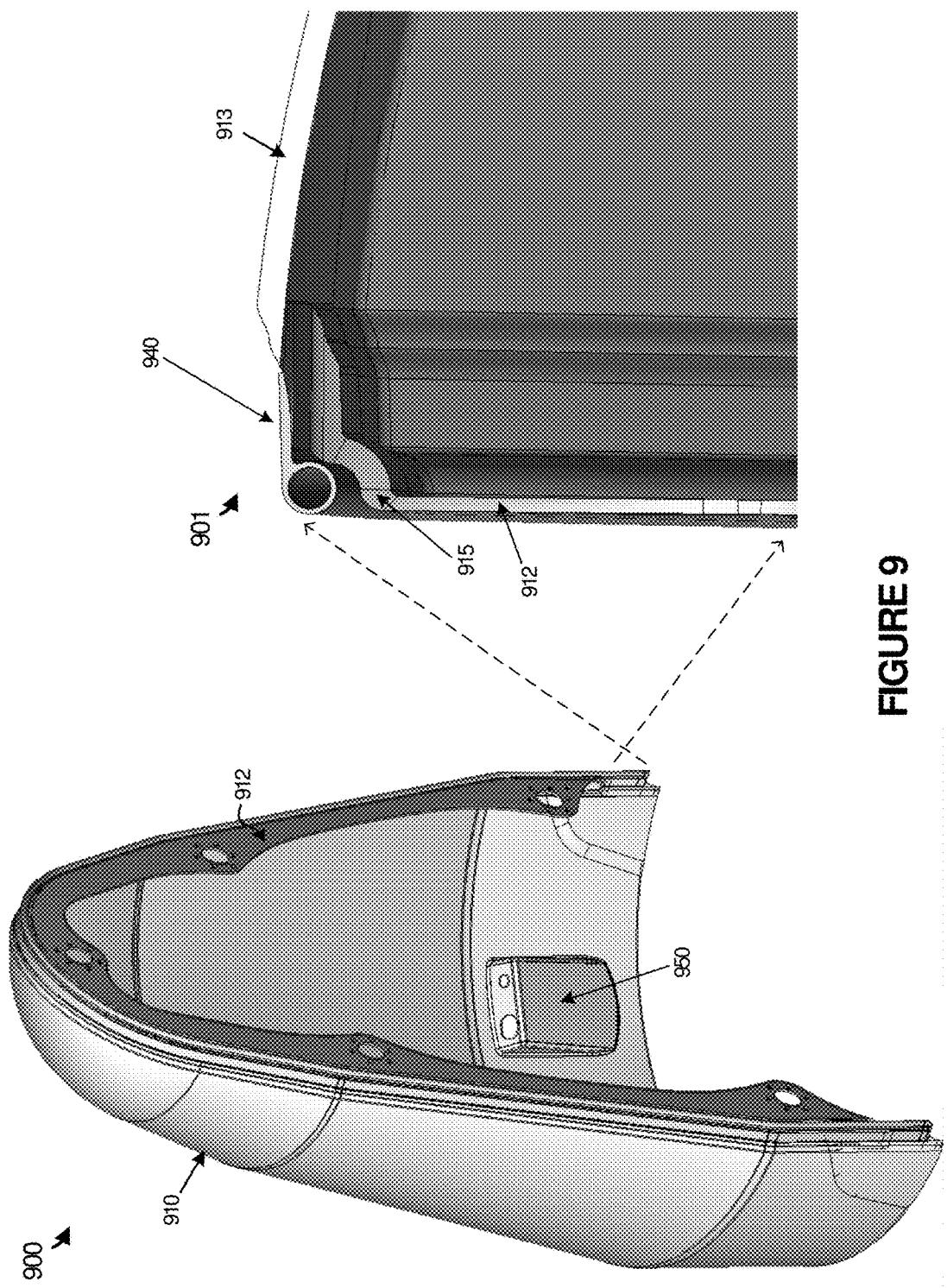
FIG. 9 illustrates fairing sealing features according to an implementation.

FIG. 9 illustrates fairing sealing features according to an implementation. In view 900, example fairing half 910 is shown. Fairing half 910 and a second fairing half (not pictured) are joined together to form a fairing and can be mounted to a payload adapter or launch vehicle. Also shown in FIG. 9 is port feature 950. Port feature 950 is optional and can comprise one or more ports for gas or moisture purging, refrigeration/cooling, heating, and electrical/mechanical umbilical connections. View 901 illustrates a detailed cross-sectional view of a joint formed between fairing half 910 and a second fairing half. View 901 is rotated and flipped from the orientation shown in view 900 to better illustrate the sealing features.

Fairing half 910 comprises an alternate implementation of fairing half 813 of FIG. 8. Fairing half 813 of FIG. 8 employs thermal protection material 822 and gasket 823 on internal flange 830 to seal gap 833, along with the bending of tab 825. However, fairing half 910 omits thermal protection material 822, and instead has a different configuration of gasket, namely gasket 940, and a different mating shape comprising features 915. This can potentially lead to ease in manufacturing by omitting material 822. Fairing half 910 is mated with fairing half 812 of FIG. 8, which includes tab 825. When mated, fairing half 910 and fairing half 812 form a complete fairing, such as seen for fairing 810. Tab 825 would function similarly with fairing half 910 is mated to fairing half 812, as discussed in FIG. 8.

Fairing half 910 comprises flange 912 which runs substantially along the inner perimeter of fairing half 910. As seen in view 901, flange 912 has curved features 915 which provide a mating surface for gasket 940. Curved features 915 comprise two connected arcs that provide a recess for at least a portion of gasket 940. Fairing half 910 might be formed from composite material, as described above for fairing half 913. Flange 912 might be formed from similar composite material as fairing half 910, or may comprise other suitable materials. In some examples, flange 912 is formed into a single piece or member as fairing half 910. In other examples, flange 912 can be a separate member from fairing half 910, and can be joined to fairing half 910 via adhesives, welds, fasteners, and the like.

Gasket 940 comprises a circular or tubular portion and tab portion, shaped as a p-seal, bulb seal, or equivalent. Gasket 940 comprises silicone, Viton, rubber, composite materials, metal-impregnated silicone or rubber materials, or other materials with high-temperature tolerance characteristics. The tubular portion of gasket 940 might be of a similar composition as the tab portion of gasket 940, although variations are possible. The tab portion of gasket 940 can be coupled to body 913 of fairing half 910, and gasket 940 runs substantially along a mating edge of fairing half 910. In some examples, gasket 940 runs the entire mating edge, but other examples might omit gasket 940 from small portions of the mating edge.

This coupling of gasket 940 to body 913 of fairing half 910 can be adhesive or via fastener. However, in this example, the coupling might be achieved using sewn thread material to attach gasket 940 to body 913. This thread material can comprise various materials with high-tensile strength, resilience, and temperature-tolerance, such as fibers comprising aramids, Kevlar, Nomex, Ultra-high-molecular-weight polyethylene, Dyneema, Spectra, Nylon, metallic fibers, or other similar fiber materials. One or more holes can be pre-drilled into body 913 to form penetration features for stitching the fibers through body 913 to secure the tab portion of gasket 940 to body 913. Various stitching or sewing techniques or styles might be employed, such as 2 stiches per inch, among others.

As with fairing 810 of FIG. 8, fairing half 910 is mated with fairing half 912 to form a completed fairing. Tab 825 functions similarly in this alternate configuration using fairing half 910. Specifically, tab 825 provides for a self-sealing overlap joint between fairing halves to prevent air penetration and thermal penetration to an interior volume or internal envelope of fairing 810. In FIG. 8, the fairing seal system is presented comprising an exterior sealing lip formed by tab 825 disposed along a corresponding perimeter of fairing half 812 and proximate to a corresponding internal flange 820 of fairing 812. Tab 825 is configured to overlap fairing half 910 when these fairing halves are mated together to form a rocket fairing. Fairing half 812 includes this tab feature disposed along a fairing mating edge, and tab 825 is configured to overlap external to the rocket fairing at least a portion of a mating edge of a second of the fairing halves (910).

Advantageously, the deformable and overlapping tab features of the fairing halves provide for an enhanced self-sealing among fairing halves. Also, any gap in an external thermal barrier is advantageously not positioned over a fairing split line or interface. In addition to the deformable tab features, a further internal gasket or O-ring fairing seal can significantly reduce thermal ingress and reduce the possibility of fairing halves sticking together during separation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A rocket fairing system, comprising:
a first fairing portion of the rocket fairing comprising a first internal flange disposed along a perimeter of the first fairing portion and having a plurality of hold down release mechanisms (HDRMs);
a second fairing portion of the rocket fairing comprising a second internal flange disposed along a perimeter of the second fairing portion and having a plurality of separation mechanisms;
the plurality of HDRMs configured to mate with the plurality of separation mechanisms and hold together the first fairing portion and the second fairing portion at the first internal flange and the second internal flange until deployment of the rocket fairing, and release from the plurality of separation mechanisms to separate the first fairing portion from the second fairing portion using at least a spring force of the plurality of separation mechanisms that push on the plurality of HDRMs; and
a plurality of fairing clamps internal to the rocket fairing and configured to hold a base of the rocket fairing to a payload adapter, the plurality of fairing clamps each comprising:
a hook portion configured to rotatably engage a pin mounted to a corresponding fairing portion to hold a base of the corresponding fairing portion in contact with the payload adapter;
a base HDRM configured to hold a spring under compression when the corresponding fairing portion is held to the payload adapter, and allow the spring force to act between the hook portion and a structural member coupled to the payload adapter when released;
a linkage disposed between the hook portion and the structural member configured to direct movement of the corresponding fairing portion upwards and away from the payload adapter while the pin pivots within the hook portion and before release of the pin from a gap in the hook portion.

2. The rocket fairing system of claim 1, wherein the plurality of HDRMs are electrically actuated to release the spring force of the plurality of separation mechanisms without the use of pyrotechnic, hydraulic, or pneumatic elements.

3. The rocket fairing of claim 1, wherein the linkage prevents contact of the corresponding fairing portion to the payload adapter and a body of an associated rocket during deployment of the rocket fairing from the associated rocket.

4. The rocket fairing of claim 1, wherein the base HDRM is electrically actuated to release the spring force without the use of pyrotechnic, hydraulic, or pneumatic elements.

5. The rocket fairing system of claim 1, further comprising:
a fairing seal system comprising an exterior sealing lip disposed along a corresponding perimeter of either the first fairing portion or the second fairing portion and proximate to a corresponding one of the first or second internal flange, and configured to overlap the first fairing portion and the second fairing portion when mated together to form the rocket fairing; and
the exterior sealing lip configured to deform inward under a pressure differential between an exterior of the rocket fairing and an interior of the rocket fairing to at least reduce a gap between the first fairing portion or the second fairing portion.

6. The rocket fairing system of claim 5, the fairing seal system further comprising:
a gasket deposited in at least a portion of the gap between the first internal flange and the second internal flange.

7. The rocket fairing system of claim 1, comprising:
the plurality of HDRMs configured to hold springs of the plurality of separation mechanisms in compression until the deployment of the rocket fairing using rods that couple to the plurality of separation mechanisms, wherein responsive to the deployment the plurality of HDRMs are actuated to release the spring force of the plurality of separation mechanisms.

8. The rocket fairing system of claim 7, comprising:
the plurality of HDRMs configured to pivot during deployment of the rocket fairing to maintain an angle of the rods generally parallel with respect to an underlying payload adapter until at least clearance of the rods from the plurality of separation mechanisms.

9. A deployable rocket fairing, comprising:
two fairing halves configured to be mated together to form an internal payload envelope;
at least two fairing clamps each comprising:
a hook member configured to rotatably engage a mating feature coupled to a corresponding fairing half;
a hold down release mechanism (HDRM) configured to hold a base of the corresponding fairing half to a payload carrier by at least engaging the mating feature via the hook member and holding a spring under compression, and based at least on the rocket fairing being deployed, allow a spring force to act between the hook member and a structural member coupled to the payload adapter; and a linkage disposed between the hook member and the structural member, configured to direct the movement of the corresponding fairing half upwards and away from the payload adapter while the mating feature pivots within the hook member before release of the mating feature from a gap in the hook member.

10. The rocket fairing of claim 9, wherein the at least two fairing clamps are configured to be contained within the internal payload envelope at least when the two fairing halves are held together.

11. The rocket fairing of claim 9, wherein the HDRM of each of the at least two fairing clamps comprises an electrically actuated HDRM.

12. The rocket fairing of claim 9, the two fairing halves comprising:
a plurality of electrically actuated hold down and release elements configured to compress associated spring elements and hold together the two fairing halves until deployment of the rocket fairing, and responsive to the deployment, separate the two fairing halves by releasing at least spring forces provided by the spring elements to push apart the two fairing halves.

13. The rocket fairing of claim 9, further comprising:
a first of the fairing halves comprising a tab feature disposed along a mating edge and configured to overlap external to the rocket fairing at least a portion of a mating edge of a second of the fairing halves; and
the tab feature configured to deform inward under a pressure differential between an exterior of the rocket fairing and the internal payload envelope to at least reduce a gap between the two fairing halves.

14. A split fairing for a payload launch system, comprising:
two fairing halves configured to be mated together to form an internal payload envelope;
a first of the fairing halves comprising a tab feature disposed along a mating edge and configured to overlap external to the split fairing at least a portion of a mating edge of a second of the fairing halves;
a gasket deposited in at least a portion of the gap between the two fairing halves, wherein the gasket is coupled via stitching to a body of the second of the fairing halves, and wherein the gasket runs substantially along the mating edge; and
the tab feature configured to deform inward under a pressure differential between an exterior of the split fairing and the internal payload envelope to at least reduce a gap between the two fairing halves.

15. The split fairing of claim 14, further comprising:
a thermal protection material deposited in at least a portion of the gap between the two fairing halves and configured to reduce thermal ingress into the internal payload envelope from at least airflow external to the split fairing, wherein the gasket is disposed within a channel in the thermal protection material.

16. The split fairing of claim 14, wherein the gasket is formed from a material comprising at least one among silicone, metal-impregnated silicone, Viton, and high-temperature tolerance rubber material.

17. The split fairing of claim 14, further comprising:
a plurality of fairing clamps internal to the split fairing and configured to hold a base of the split fairing to a payload adapter, the plurality of fairing clamps each comprising:
a hook portion configured to rotatably engage a pin mounted to a corresponding fairing portion to hold a base of the corresponding fairing portion in contact with the payload adapter;
an electrically actuated hold down release element configured to hold a spring under compression when the corresponding fairing portion is held to the payload adapter, and allow the spring force to act between the hook portion and a structural member coupled to the payload adapter when released;
a linkage disposed between the hook portion and the structural member configured to direct movement of the corresponding fairing portion upwards and away from the payload adapter while the pin pivots within the hook portion and before release of the pin from a gap in the hook portion.

18. The split fairing of claim 14, further comprising:
a plurality of electrically actuated hold down and release elements configured to compress associated spring elements and hold together the two fairing halves until deployment of the split fairing, and responsive to the deployment, separate the two fairing halves by releasing at least spring forces provided by the spring elements to push apart the two fairing halves.

19. A split fairing for a payload launch system, comprising:
two fairing halves configured to be mated together to form an internal payload envelope;
a first of the fairing halves comprising a tab feature disposed along a mating edge and configured to overlap external to the split fairing at least a portion of a mating edge of a second of the fairing halves;
the tab feature configured to deform inward under a pressure differential between an exterior of the split fairing and the internal payload envelope to at least reduce a gap between the two fairing halves; and
a plurality of fairing clamps internal to the split fairing and configured to hold a base of the split fairing to a payload adapter, the plurality of fairing clamps each comprising:
a hook portion configured to rotatably engage a pin mounted to a corresponding fairing portion to hold a base of the corresponding fairing portion in contact with the payload adapter;
an electrically actuated hold down release element configured to hold a spring under compression when the corresponding fairing portion is held to the payload adapter, and allow the spring force to act between the hook portion and a structural member coupled to the payload adapter when released; and
a linkage disposed between the hook portion and the structural member configured to direct movement of the corresponding fairing portion upwards and away from the payload adapter while the pin pivots within the hook portion and before release of the pin from a gap in the hook portion.

* * * * *